ANALOG TO DIGITAL CONVERTER USING ELECTROLUMINESCENT DEVICE

Filed April 30, 1962 2 Sheets-Sheet 1

INVENTORS
Martin Berger
Albert L. de Graffenried
BY Leonard H. King
ATTORNEY

ANALOG TO DIGITAL CONVERTER USING ELECTROLUMINESCENT DEVICE

Filed April 30, 1962

INVENTORS
Martin Berger
Albert L. de Graffenried
BY Leonard H. King
ATTORNEY

United States Patent Office 3,213,445

Patented Oct. 19, 1965

3,213,445

ANALOG TO DIGITAL CONVERTER USING ELECTROLUMINESCENT DEVICE

Martin Berger, North Arlington, N.J., and Albert L. de Graffenried, Rosiyn Harbor, N.Y., assignors to Avien, Inc., Woodside, N.Y.

Filed Apr. 30, 1962, Ser. No. 191,185
7 Claims. (Cl. 340—347)

The present invention relates to means for producing digital coded signals proportional to a selected function of a continuously variable input signal. More specifically, the present invention provides means for transducing an electrical input signal to an elongated electroluminescent light source of variable length, the physical length of said light source being an analog of the magnitude of this signal, and converting this analog to discrete electrical output signals which are digital representation of this analog, hence of the original input signal.

The variable light source utilized in the present invention is an electroluminescent device of the type disclosed in copending application of Albert L. de Graffenried, Serial No. 24,030, now Patent No. 3,038,097, filed April 22, 1960. This device, while adapted to produce novel display means for monitoring various environmental conditions, is also highly useful as an analog function generator. That is, an input signal to the above-referenced device causes an electroluminescent member to glow, the length of the illuminated portion of the member being indicative of the amplitude of the input signal. It is proposed in the present invention to use a coding plate to select a portion of the light emitted by the luminous bar and transmit this light to an appropriate photocell circuit whereby an electrical output in digital form is obtained.

It is a primary object of the present invention to provide an analog to digital converter of the type described characterized by a high order of reliability and extreme simplicity in design, with minimal use of moving parts.

A further object of the present invention is to provide a flexible digital converter which can use coding plates for various numerical bases.

Another object of the present invention is to provide for superior information transmission means thereby reducing error to a minimum.

Yet a further object of the present invention is to provide novel means for generating analog functions.

These and other objects and advantages of the present invention will be pointed out with further particularity or will be apparent from the following description in conjunction with the drawing appended thereto in which.

Figures 1, 4:
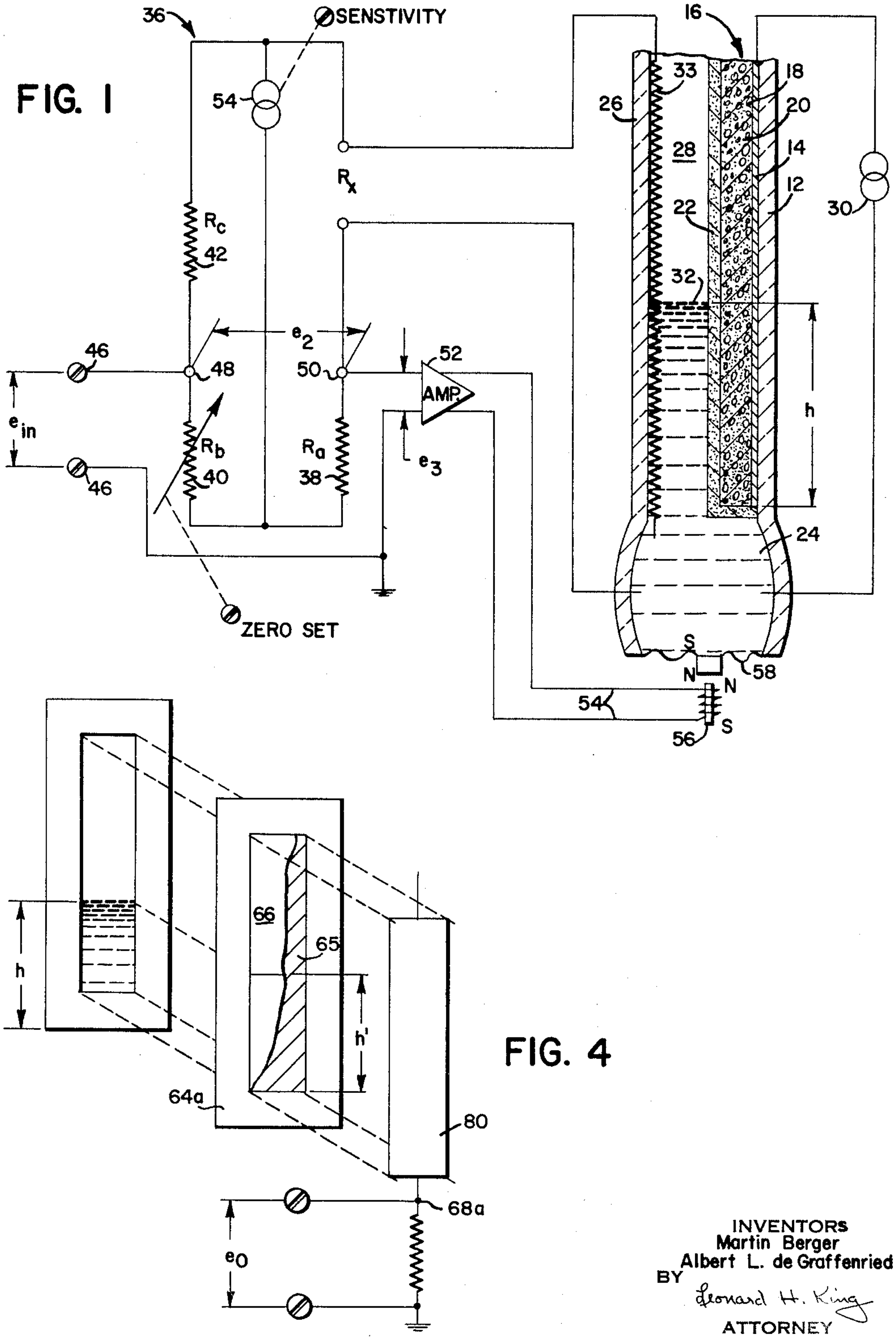
FIG. 1 is a vertical cross-section of the indicating means of the present invention together with a schematic diagram of the circuit used.
FIG. 4 is a simplified diagram showing means for generating analog functions utilizing the device of the present invention.

Referring more particularly to the drawing, FIG. 1 is a view in cross-section of the present invention, characterized generally by the numeral 10, comprising a glass plate 12 upon which is deposited a transparent conducting layer 14. Layer 14 may conveniently be a vacuum deposited metal or metallic oxide, and constitutes the front fixed electrode for the device. Immediately behind this is an electroluminescent mosaic 16 formed of phosphor particles 18, in solid suspension in an insulator medium such as low temperature glass or ceramic frit 20. Protect layer 22 is a thin layer of low temperature ceramic interposed between mosaic 16 and conducting fluid electrode 24. The liquid metal mercury constitutes the movable electrode. Backing plate 26 formed of "Plexiglas," or the like, in conjunction with protect layer 22, defines chamber 28 wherein mercury 24 is contained. Alternating voltage 30, applied between front and rear electrodes 14 and 24, respectively, subjects phosphor particles 18 to a fluctuating electric field, which causes the phosphor to emit electroluminescent light. Only those particles below the level 32 on the top of the mercury column will emit light. Particles above this level experience no fluctuating electric field. It will therefore be appreciated that as the electric column rises and falls, the observer in front of the instrument will see a moving electroluminescently lighted vertical bar.

As illustrated in the schematic, FIG. 1, liquid level 32 is responsive to an input signal $e_{in}$ by closed loop negative feed-back means well known in the art, whereby the height of the measuring column is an analog of the magnitude of the input signal. In this circuit, feed-back resistance wire 34 is in contact with conductive liquid 24. As the liquid level rises, it shorts out corresponding amounts of resistance in wire 34, the combined resistance of liquid 24 and resistance wire 34 serving as a variable resistor $R_x$ of bridge 36. Resistors 38, 40 and 42 form arms $R_a$, $R_b$, and $R_c$, respectively. $R_b$ is preferably a variable resistor so that it can serve as a zero-adjust. A source of constant potential 44 is connected across one diagonal of the bridge. A signal $e_{in}$ whose magnitude is to be indicated is applied to terminals 46, one terminal being connected to terminal 48 of the output diagonal of the bridge, the other terminal 50 of bridge 36 being connected to the input terminal of amplifier 52. Thus it will be appreciated that there is applied to amplifier 52 a potential which is the sum of the condition being sensed and the output signal of bridge 36. The output of amplifier 52 is fed to winding 54 of electromagnetic core 56, defining an electromagnet adapted to actuate diaphragm 58. Thus the pressure exerted on the diaphragm will be proportional to the amplitude of the signal applied to the coil.

Resistance member 34 is so designed that when the liquid column height 32 is zero, the sensing resistance is $R_x$ and is equal to $R_a$, the ohmic value of this fixed resistor. Resistors 40 and 42 are chosen so that $R_b$ is equal to $R_c$. Therefore, for this case, $e_0$ is equal to 0, where $e_0$ is the error signal produced by the bridge. As the column height increases above 0, $F_x$ decreases towards zero. This unbalances the bridge proportional to the change in $R_x$. The bridge output $e_0$ is then fed to the amplifier 52 since it is in series with input signal voltage $e_{in}$. The error signal in phased opposite $e_{in}$ whose electrical magnitude is to be indicated by the visual means of the present invention. The signal applied to amplifier 52 is $e_{in}-e_0$. Amplifier 52 amplifies this difference signal and provides a proportional D.C. signal to coil 54 which actuates magnet 56 to displace diaphragm 58. Therefore, the vertical height of the liquid column is proportional to the input signal voltage $e_{in}$.

Figure 2:
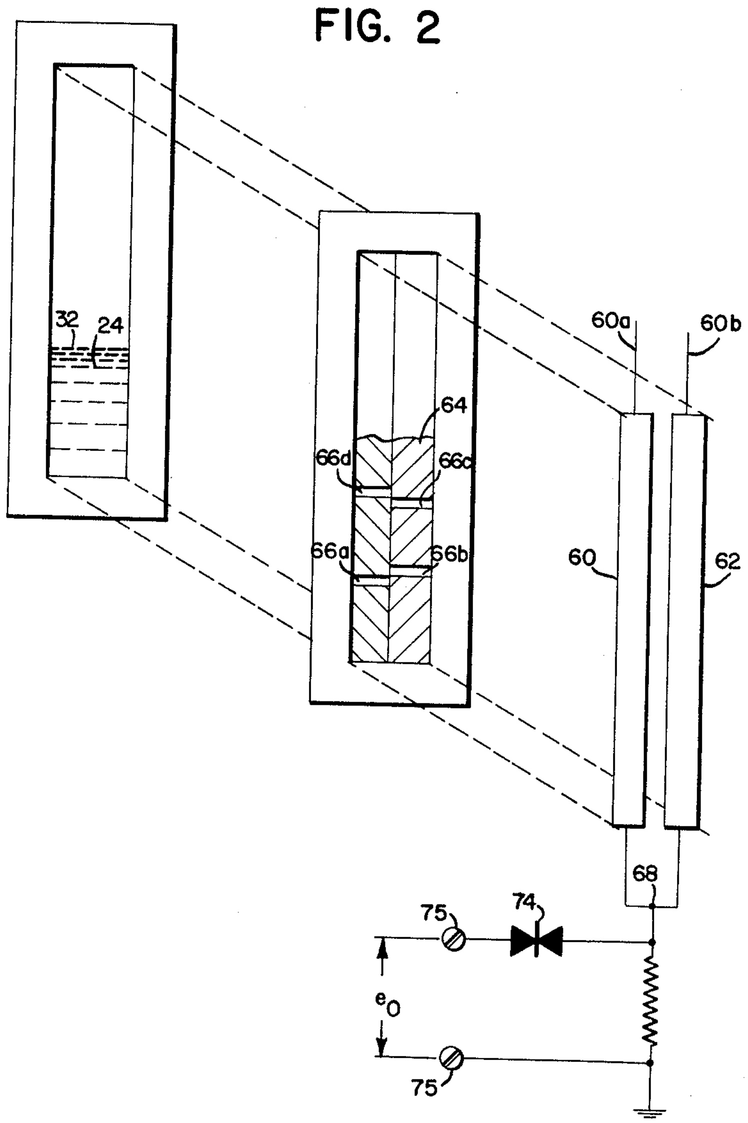
FIG. 2 is a simplified diagram of the means used to derive a digital output in the present invention.

It will be appreciated that as described hereinabove, the height of the column is an analog of the input voltage and is continuously variable as the input voltage varies. Referring now to FIG. 2, the present invention provides means to convert this input voltage to a digital output, whereby the height 32 of the electroluminescent column is sensed at selected stepped intervals by photocells 60 and 62. These photocells are separated from the light source by mask 64 which is provided with very narrow horizontal apertures 66*a*–66*d*. Photocells 60 and 62 are connected to voltages of equal magnitude and opposite polarity 60*a* and 60*b*, respectively, and are brought to a common output 68.

Figure 3:
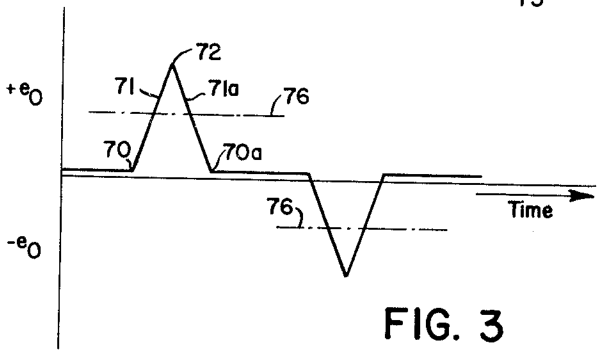
FIG. 3 is a time plot illustrating the output pulses of the present invention.

As the electroluminescent column of light rises, it first intercepts the level of aperture 66*a*, thereby passing the electroluminescent light to photoconductor 60. Since the two photoconductor strips 60 and 62 are of equal and opposite voltages, the illumination of 60 unbalances the voltage at point 68 making it shift from 0 to +. This is shown in the time plot, FIG. 3, as rise 70, 71, 72. Zener diode 74 will fire at any applied voltage algebraically above level 76. Diode 74 is a back-to-back element which is conductive at voltages above threshold voltage 76, in either the positive or negative direction, remaining non-conductive at voltages algebraically below this figure.

As the column of light continues to rise it intercepts the level of aperture 66*b* thereby illuminating photocell 62 by an amount equal to the illumination on photocell 60, thereby inducing an equal and opposite voltage in 62. This causes the voltage at point 68 to return to zero, shown on the curve plot as drop 72, 71*a*, 70*a*. As the electroluminescent column proceeds upwards, the same process will be repeated at apertures 66*c* and 66*d*, although in reverse order. In this case, output terminal 68 goes negative, then back to zero with diode 74 breaking down at voltages above the threshold voltage 76 in the negative direction.

The device hereinabove described constitutes a 2-bit element, whereby the output $e_0$ at terminals 75 can have two shifts, that is 0 to +1 and 0 to −1. To convert the digital readout to a binary number a plurality of paired cells 60–62 and a suitably apertured mask 64 is employed. It will be appreciated that this device can represent positive or negative numbers by the polarity of the binary signal pulse.

Alternately, the device of the present invention may be modified to indicate digits of higher bases than binary. To accomplish this, a coding plate formed with varying degrees of transparency rather than the horizontal aperture configuration is employed. Such a coded strip will have any base corresponding to the discrete number of light levels which the photocells can sense. For instance, a binary code plate uses only opaque and transparent areas, a trinary code uses opaque, semi-transparent and transparent areas, while a decimal code utilizes ten shades of transparency.

It will be appreciated that the amount of light emitted by the mosaic is a function not only of the height of the column but of the A.C. frequency with which the phosphor is excited. It is therefore proposed in the present invention to provide means for A.C. modulation of the phosphor, utilizing a different frequency for each digit, sequentially keyed and synchronizing with the photocell keying. This provides an output of superior transmission capabilities since increased light contrast is provided for, thus reducing ambiguity and error.

As shown in FIG. 4, the device of the present invention can be adapted to generate analog functions whereby the output at point 68*a* will be a function of height $h'$ of the electroluminescent column, the function $f(h)$ being defined by the configuration given to masking element 64*a*. Element 64*a* is coded with a graphical representation of $f(h)$ in terms of opaque and transparent areas, 65 and 66, respectively. That is transparency 66 is a continuous area wherein at each point $h'$, this height defines an area of transparency which area is a function of that height, namely $f(h)$. Therefore, the electrical output of the photoconductor at height $h$, will be the analog of $f(h)$. The total light flux reaching photoconductor 80 is defined by $$\Sigma\phi\sim\int_0^h B\cdot f(h)dh$$

where B is the intensity of illumination, $f(h)$ is the aperture function, $h$ the height of the column. By changing function cards, that is, inserting different coded mask units and varying the height of the column with time, a ready conversion of input signal to analog function of input signal can be attained.

There has been disclosed heretofore the best embodiment of the invention presently contemplated and it is to be understood that various changes and modifications may be made by those skilled in the art without departing from the spirit of the invention.

What is claimed is:

1. An analog to digital converter comprising:
(a) means to generate an electroluminiscent light source of variable size responsive to an input signal, said size defining an analog of the magnitude of said input signal;
(b) a photoconductive element disposed proximate to said light source and adapted to convert illumination from said light source to an electrical output;
(c) mask means interposed in spaced relation between said photoconductive element and said light source, said mask means having selected discrete opaque and light-passing areas formed thereon, whereby said mask will pass light in selected discontinuous digital intervals to said photoconductive element proportional to variation in size of said light source, said light intervals being converted to digital pulses at said electrical output, said pulses thereby corresponding to the magnitude of said input signal.

2. A device as in claim 1 wherein said variable light source is of longitudinal configuration, said length defining an analog of the magnitude of said input signal;
wherein said photoconductive element comprises first and second photoconductive strips disposed parallel to said light source, said first and second conductive strips being in electrical connection to first and second inputs, respectively, said first and second inputs being of equal and opposite polarity, said first and second strips being brought to a common output, said output being in electrical connection to a polarity-indicating device; and
wherein said mask means comprise first and second masking columns disposed between said first and second photoconductive strips and said light source, respectively, each of said masking columns provided with a plurality of apertures through which said light source is adapted to illuminate said first and second photoconductive strips, said apertures formed in said first masking column being axially displaced from said apertures formed in said second masking column, whereby said light source will illuminate said first and second photoconductive strips at unequal intervals corresponding to the height of said light source, whereby discrete light pulses are transmitted to said first and second photoconductive strips to thereby unbalance said strips electrically, said electrical unbalance being detected by said polarity indicating device.

3. A device as claim 2 wherein said mask means is provided with light passing means of a plurality of degrees of transparency, the number of said degrees defining the numerical base of a digital code.

4. A device as in claim 2 wherein said first and second masking columns are provided with opaque, semitransparent and transparent areas, respectively, to define a trinary code configuration.

5. A device as in claim 2 wherein said variable light source is an electroluminescent device comprising:
(a) a transparent plate vertically disposed;
(b) a transparent conducting layer deposited on said plate;
(c) an electroluminescent layer disposed in abutting relation to said conductive layer, said electroluminescent layer comprising phosphor particles in solid suspension in a dielectric material;
(d) a protect layer of relatively thin cross-section disposed in abutting relation to said electroluminescent layer, said protect layer being formed of a low temperature ceramic;

(e) a backing plate parallel to and in spaced relation to said protect layer defining a chamber therebetween;

(f) electrically conductive liquid contained in said chamber;

(g) means for varying the level of said liquid in response to said input signal; and (h) means to apply an alternating voltage between said transparent conducting layer and said conductive liquid for exciting said phosphor particles to electroluminescence.

6. A device as in claim 5 wherein said means to excite said phosphor particles include means for selectively varying the frequency of said alternating voltage to thereby control the brightness of electroluminescence generated by said phosphor particles, said frequency-varying means being keyed in registry with the length of said light source whereby selected degrees of brightness are passed by said areas of transparency on said mask means.

7. A device for generating analog functions comprising:

(a) means to generate an electroluminescent light source of longitudinal configuration responsive to an input signal, said length defining an analog of the magnitude of said input signal;

(b) a photoconductive element disposed proximate to said light source and adapted to convert illumination from said light source to an electrical output; and (c) mask means interposed in spaced relation between said photoconductive element and said light source, said mask means having a transparency formed thereon of continuous configuration wherein the length of said transparency is a function of the area thereof at each increment of said length, whereby the amount of light passed by said mask means to said photoconductive element will generate an electrical output analogous to said function.

References Cited by the Examiner

UNITED STATES PATENTS

| | | | |
|---|---|---|---|
| 2,950,418 | 8/60 | Reis | 250—213 X |
| 3,038,097 | 6/62 | Graffenried | 313—108 |
| 3,058,005 | 10/62 | Hurvitz | 340—347 |

MALCOLM A. MORRISON, *Primary Examiner.*